United States Patent [19]

Hoekstra

[11] 4,342,163
[45] Aug. 3, 1982

[54] APPARATUS FOR MOUNTING A SNOWPLOW BLADE TO A VEHICLE

[75] Inventor: Ralph W. Hoekstra, Stillman Valley, Ill.

[73] Assignee: Swenson Spreader Company, Lindenwood, Ill.

[21] Appl. No.: 183,284

[22] Filed: Sep. 2, 1980

[51] Int. Cl.³ .............................................. E01H 5/06
[52] U.S. Cl. ..................................... 37/231; 172/274; 172/817; 280/460 R; 280/495; 403/49; 403/316; 414/685
[58] Field of Search ...................... 37/41, 42 R, 42 UL, 37/50, 117.5, DIG. 3, DIG. 12; 172/817, 272, 274; 414/680, 685; 403/315, 316, 319, 49; 280/460 R, 460 A, 495, 491 R

[56] References Cited

U.S. PATENT DOCUMENTS

| | | | |
|---|---|---|---|
| 1,199,613 | 9/1916 | Richardson | 280/495 |
| 1,920,475 | 8/1933 | Meyer | 37/42 |
| 2,601,974 | 7/1952 | Hytte | 403/319 X |
| 3,214,138 | 10/1965 | Jocher et al. | 37/42 R X |
| 3,828,449 | 8/1974 | Miceli | 37/41 |
| 3,851,894 | 12/1974 | St. Pierre | 37/42 R X |
| 3,949,706 | 4/1976 | Coon, Jr. | 414/685 X |
| 3,987,562 | 10/1976 | Deen et al. | 37/42 R |
| 4,215,496 | 8/1980 | Wehr | 37/42 R X |

FOREIGN PATENT DOCUMENTS 286800 11/1952 Switzerland ...................... 37/42 R Primary Examiner—Edgar S. Burr
Assistant Examiner—Moshe I. Cohen
Attorney, Agent, or Firm—Trexler, Bushnell & Wolters, Ltd.

[57] ABSTRACT

A novel structure is provided for joining a frame member for carrying a snowplow blade or the like to a vehicle-mounted lift frame or the like. At least one mounting bracket is rigidly attached to the lift frame and includes a pair of parallel, generally vertical walls supporting a generally horizontal mounting rod therebetween. A cooperating mounting ear is provided on the blade-carrying frame and is of lesser width than the space between the parallel walls of the mounting bracket. This mounting ear presents a slot of predetermined depth which is rotatably engageable with the mounting rod to define a rotatable joint. A retaining pin is insertable through the mounting bracket vertically above the mounting rod and substantially parallel therewith. The space between the retaining pin and the mounting rod is sufficient to allow some vertical play in addition to rotation of the mounting ear with respect to the mounting rod but of lesser extent than the predetermined depth of the slot in said mounting ear so as to prevent disengagement thereof. A lift arm link is removably mounted at an upper portion of the lift frame and positioned for transmitting motion between a lifting piston and the blade-carrying frame member to effect lifting and lowering of a snowplow blade. This lift arm link is also mountable to the blade-carrying frame for holding the mounting ear above the ground at a level substantially similar to the level of the mounting rod to facilitate engagement or disengagement thereof.

18 Claims, 5 Drawing Figures

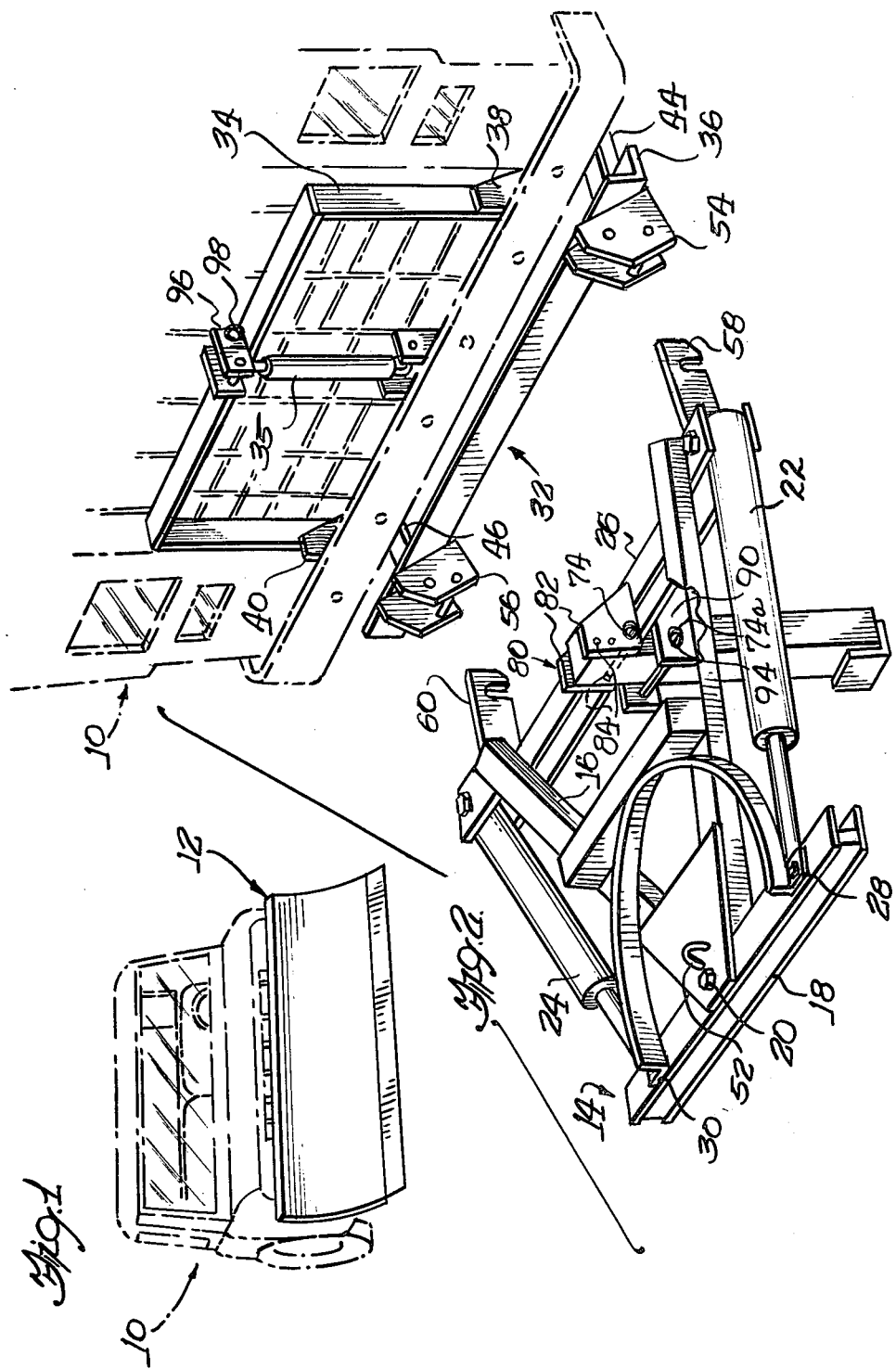

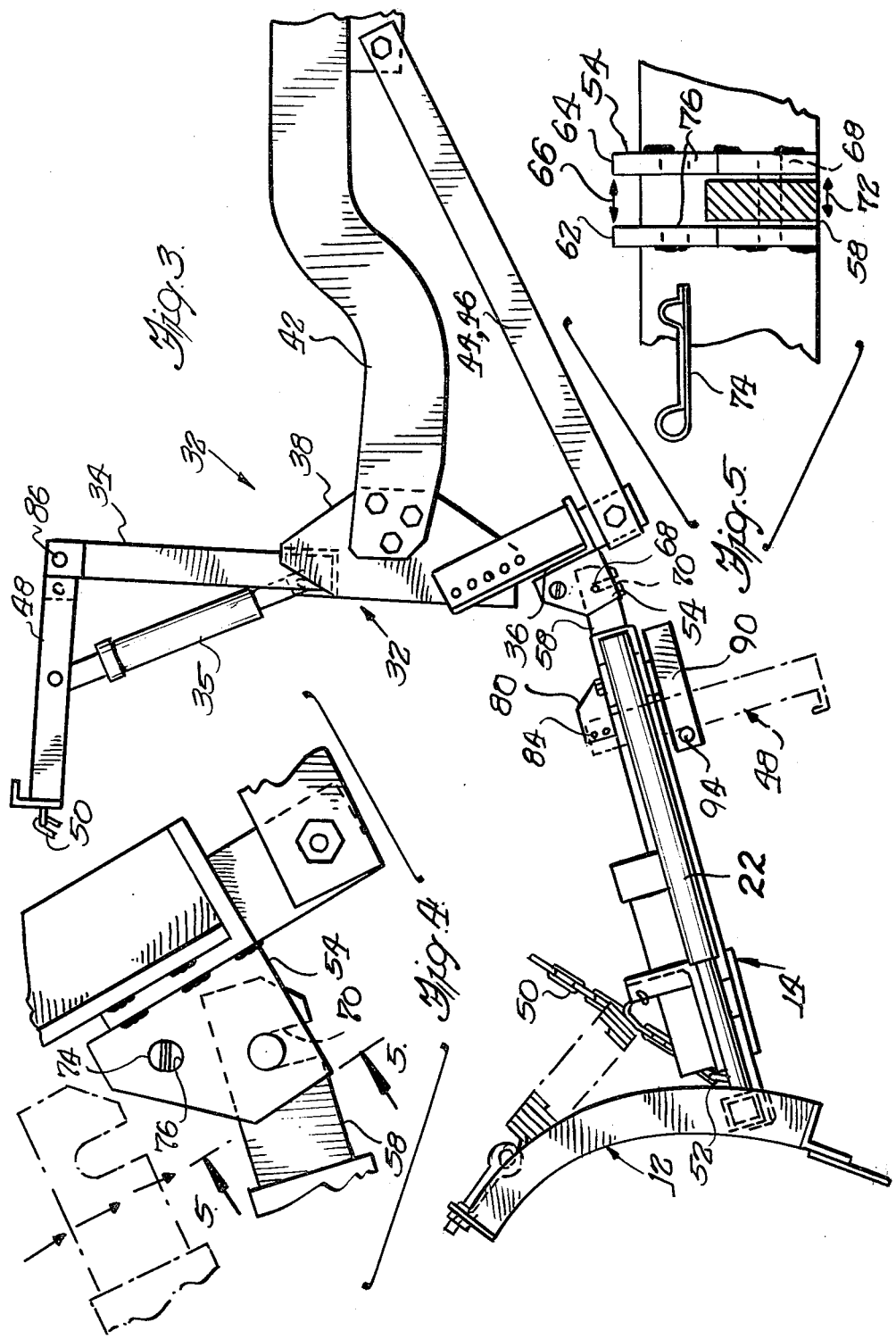

APPARATUS FOR MOUNTING A SNOWPLOW BLADE TO A VEHICLE

BACKGROUND OF THE INVENTION

The present invention is directed generally to vehicle-mounted implements and more particularly to a novel arrangement for effecting attachment of a snowplow blade or the like to a vehicle.

Many arrangements have heretofore been proposed for attaching an implement such as a snowplow blade or the like to a vehicle for use in performing snow removal or other similar tasks. Effective plowing requires that the blade be capable both of angular movement both left and right and of vertical movement, raising and lowering the blade to assume a transport position and a working position, respectively. Additionally, when the snowplow blade is in the working position, it is desirable that the effective weight of the blade be relatively low and that the blade be allowed to "float" relatively freely in order to substantially follow the contour of the surface to be plowed.

To these ends, a relatively effective hydraulic system has been heretofore developed, including a pair of opposed cylinders for effecting left and right angling movement and a generally vertically disposed cylinder for effecting raising and lowering of the snowplow blade. Moreover, there has been developed an effective dual-frame system for carrying the snowplow blade upon a vehicle. This system includes a first framework for mounting the blade together with the hydraulic cylinders for left and right angling thereof and a second framework or lift frame mounted to the vehicle, for receiving the blade-carrying frame and for carrying the raising and lowering hydraulic apparatus.

However, one problem still encountered is that of providing effective, yet simple, coupling or joining structure for attaching the blade-carrying frame to the vehicle mounted frame. In particular, many such coupling or joining arrangements have been relatively complex, utilizing a great number of parts and requiring considerable skill of an operator in effecting the coupling of the two framework members. Such a coupling must be quite secure and reliable once the two frames are joined for plowing, yet allow some degree of play or movement therebetween. In this latter regard, it is desirable to allow for some degree of twisting or rotation in the horizontal plane of the snowplow blade, in order to more closely follow an uneven ground surface. However, many prior art coupling arrangements have been quite rigid in order to accomplish the desired secure coupling, failing to yield sufficiently to permit such twisting or rotational movement of the blade to a sufficient extent to permit the blade to follow an uneven ground contour in this fashion.

OBJECTS AND SUMMARY OF THE INVENTION

Accordingly, it is a general object of this invention to provide a new and improved coupling apparatus for joining a snowplow blade-carrying frame to a vehicle mounted lift frame.

A related object is to provide an improved coupling arrangement in accordance with the foregoing object which is relatively easy for a single operator to attach when snowplowing is to be accomplished and relatively simple to again detach when the vehicle is to be utilized for other purposes.

A further object is to provide a coupling arrangement in accordance with the foregoing objects which comprises relatively few and simple parts and requires but a minimum of modification to existing blade-carrying frames and vehicle lift frames.

Yet another object is to provide a coupling arrangement in accordance with the foregoing objects which is relatively durable and reliable in maintaining a secure coupling while still allowing some degree of play to permit a degree of twisting or rotational motion of the blade in a horizontal plane, so that the blade will tend to follow an uneven ground contour.

Briefly, and in accordance with the foregoing objects, a coupling arrangement in accordance with the present invention comprises mounting bracket means coupled to said lift frame, mounting ear means on said blade-carrying frame, said mounting ear means being rotatably engageable with said mounting bracket means to define a rotatable joint between the blade-carrying frame and the lift frame, a retaining pin, and means in said mounting bracket means for removably receiving said retaining pin for retaining said mounting ear rotatably engaged therewith and further cooperating means in said mounting bracket means and said mounting ear means for permitting a predetermined amount of play therebetween in both vertical and horizontal planes.

BRIEF DESCRIPTION OF THE DRAWINGS

Other objects, features and advantages of the invention will be more readily appreciated upon reading the following detailed description of the illustrated embodiment together with reference to the accompanying drawings, wherein:

FIG. 1 illustrates a typical vehicle-mounted snowplow blade;

FIG. 2 is an enlarged perspective view of a snowplow blade-carrying frame and a vehicle-mounted lift frame provided with novel apparatus in accordance with the present invention;

FIG. 3 is a side elevation, similar to FIG. 2, illustrating further aspects of the apparatus of the invention;

FIG. 4 is an enlarged view of a portion of FIG. 3, illustrating further details thereof; and FIG. 5 is a view taken generally along the line 5—5 of FIG. 4.

DETAILED DESCRIPTION OF THE ILLUSTRATED EMBODIMENT

Referring now to the drawings, and initially to FIG. 1, a vehicle, designated generally by the reference numeral 10 is provided with a snowplow blade, designated generally by the reference numeral 12.

Reference is next invited to FIGS. 2 and 3, which illustrate the novel apparatus of the invention for mounting the snowplow blade 12 to the vehicle 10, in the manner illustrated in FIG. 1.

In accordance with conventional practice, the blade 12 (not shown in FIG. 2) is carried by a blade-carrying framework or frame member, designated generally by the reference numeral 14. This framework 14 is primarily conventional in nature and as it forms no part of the present invention, will not be described in detail herein. Suffice it to say that the framework 14 includes a main "A-frame" portion 16, which pivotally mounts a blade-carrying cross-beam or member 18 at its apex 20. A pair of hydraulic pistons-and-cylinders 22 and 24 extend between a bottom cross-beam or member 26 of the A-frame 16 and respective ends 28, 30 of the blade-carrying cross-beam 18. These hydraulic pistons-and-cylinders 22 and 24 are pivotally mounted to the respective cross-beam members 18 and 26.

Referring now to the vehicle 10, there is provided a conventional vehicle-mounted lift frame designated generally by the reference numeral 32. This lift frame 32 is primarily conventional in nature and need not be described in detail. Suffice it to say that the lift frame 32 includes a rectangular frame portion 34 which carries a substantially vertically mounted hydraulic cylinder 35, for effecting raising and lowering of the snowplow blade 12. This lift frame 32 is also provided with a frame portion 36 constructed in accordance with principles of the present invention, for receiving the blade-carrying frame 14.

As best viewed in FIG. 3, the lift frame portions 34 and 36 are both carried by rigid support members 38, 40 which are securely bolted or otherwise affixed to the main frame 42 of the vehicle 10. Further support is provided the lift frame portion 36 by a pair of support arms 44, 46 which join a lower portion thereof with a lower portion of the vehicle frame 42.

Briefly, the rectangular lift frame portion 34 receives one end of the lifting piston 35, substantially horizontally centered thereon. A piston carried by the cylinder 35 actuates a lift arm link 48, which is pivotally mounted to lift frame portion 34, extending outwardly thereof at an angle which varies somewhat about 90°, depending upon the degree of extension of the piston carried within cylinder 35. The outward end of the lift arm link 48 receives a chain 50, whose opposite end is joined with a suitable eye 52 mounted at a leading portion of the A-frame portion 16 of the blade-carrying frame 14.

In accordance with a feature of the invention, the lift frame portion 36 carries a pair of similar bracket members 54, 56, the bracket 54 being illustrated somewhat enlarged in FIG. 4. Cooperatively, the blade-carrying frame 16 is provided with a pair of mounting ears 58, 60, which, in accordance with the present invention, are conformed to mount with the brackets 54, 56, to achieve pivotal coupling of the blade-carrying frame 14 with the lift frame 32.

Referring also to FIGS. 4 and 5, the bracket 54, which is substantially identical with the bracket 56, includes a pair of generally vertically disposed sidewalls 62, 64, which are spaced apart by a predetermined dimension 66. The sidewalls 62 and 64 are also of predetermined vertical dimension or height, as will be discussed later.

A generally horizontal mounting rod 68 spans the gap between bracket sidewalls 62 and 64 generally at a lower portion thereof and is generally perpendicular thereto. This mounting rod 68 rotatably receives a similarly dimensioned mounting ear 58, which is substantially identical in configuration with the mounting ear 60. Advantageously, the width dimension 72 of mounting ear 58 is slightly less than the width dimension 66 between the sidewalls 62 and 64 of mounting bracket 54, to allow a limited degree of play therebetween.

In order to prevent unintended removal of mounting ear 58 from mounting bracket 54, a retaining pin 74 is inserted through a pair of vertically aligned receiving apertures 76 provided therefor in the sidewalls 62, 64 of the bracket 54.

In accordance with a feature of the invention, the vertical distance along sidewalls 62 and 64 between these apertures 76 and the mounting rod 68 is somewhat greater than the vertical height of the ear 58 less the depth of the slot 70, but is less than the depth of the slot 70. Accordingly, while a degree of vertical play is allowed therebetween, the removal of mounting ear 58 from bracket 54 is precluded by insertion of the pin 74 through the apertures 76. Preferably, the retaining pin 74 is a keeper hairpin so as to be easily manually insertable and removable.

In accordance with a further feature of the invention, the lift arm link 48 may alternatively be mounted to the blade-carrying frame 14 to provide a stand or prop therefor to aid in the attachment thereof to the lift frame 32. In this regard, suitable brackets 80, 90 are provided on the frame 14 for receiving the lift arm link 48 so as to hold the ears 58, 60 at a similar vertical level to that of the cooperating mounting brackets 54, 56. Thus interengagement thereof is greatly facilitated.

The bracket 80 includes a pair of side wall portions 82, which are generally vertical, parallel and spaced apart and are mounted generally at an upper portion of the cross-beam or member 26 of the frame 14. The sidewall portions 82 are provided with a plurality of vertically aligned through apertures 84 for selective alignment with a similar through aperture 86 generally at an upper end of lift arm link 48. The retaining pin 74 is selectively insertable through the aligned apertures 84, 86 in the bracket 80 and the lift arm link 48 for choosing one of several possible vertical levels at which the lift arm link 48 will hold the blade-carrying frame 14. In order to securely hold the lift arm link 48 substantially perpendicular to the blade-carrying frame 14, the second, retaining bracket 90 is provided generally at the lower surface of cross-beam or member 26 and extends outwardly to lead the leading surface of the lift arm link 48. Accordingly, the other retaining pin 74a (from bracket 56) is insertable through apertures 94 provided therefor in the bracket portion 90, so as to abut the leading face or surface of lift arm link 48, substantially preventing any rotational motion thereof about the pin 74.

Accordingly, the lift arm link 48 is selectively removable from its customary position attached to lift frame portion 34 for selective use as a stand or prop for snowplow blade 12 and snowplow blade-carrying frame 14. In order to secure the lifting cylinder 35 when the lift arm link 48 is used for the latter purpose, a suitable bracket 96 is provided, together with a suitable retaining pin 98, at the top, central portion of rectangular lift frame portion 34.

In operation, the novel arrangement of mounting brackets 54, 56 and the mounting ears 58 and 60 allows for some degree of twisting motion of the blade 12 in the horizontal plane, so as to better follow an uneven ground contour, for example. In this regard, it will be remembered that the spacing of retaining or locking pin 74 in the vertical plane is such that some amount of space is left for vertical movement of the ear 58, while still being retained rotatably with mounting rod 68. The play allowed by this choice of relative dimenions, as well as that allowed by the difference in dimensions 72 and 66 heretofore mentioned, therefore allows sufficient degree of play, in both the vertical and horizontal planes, of mounting ear 58 with respect to mounting bracket 54. Accordingly, it will be appreciated that some degree of the aforesaid twisting motion of snowplow blade 12 is allowed by this arrangement, without detracting from the integrity of the joint formed thereby.

While a preferred embodiment has been illustrated and described herein, the invention is not limited thereto. On the contrary, those skilled in the art may devise various alternatives, modifications and changes. The present invention is intended to include all such alternatives, modifications and changes insofar as they fall within the spirit and scope of the appended claims.

The invention is claimed as follows:

1. Apparatus for joining a frame member for carrying a snowplow blade or the like to a vehicle-mounted lift frame or the like, comprising: at least one mounting bracket member rigidly attached to said lift frame and including a pair of parallel, generally vertical walls supporting a generally horizontal mounting rod therebetween, means forming at least one mounting ear on said blade-carrying frame, said mounting ear being of lesser width than the space between said parallel, generally vertical walls of said mounting bracket member and having a generally vertically oriented slot therein of predetermined depth, said slot being rotatably engageable with and over said generally horizontal mounting rod to define a rotatable joint, a retaining pin, and means in said mounting bracket member for removably receiving said retaining pin generally vertically above said mounting rod and substantially parallel therewith, the space between said retaining pin receiving means and said mounting rod being sufficient to allow relative rotation of said mounting ear with respect to said mounting rod but of lesser extent than said predetermined depth of said slot in said mounting ear and further including a lift arm link mounted at an upper portion of said lift frame and positioned for transmitting motion between a lifting piston and said blade-carrying frame member to effect lifting and lowering of a snowplow blade or the like mounted to said blade-carrying frame member, means for removably mounting said lift arm link to said lift frame including a lift frame bracket formed in said lift frame and cooperating apertures in said bracket and in said lift arm for receiving a pin, thereby rotatably mounting said lift arm link to said lift frame, and means on said blade-carrying frame for removably mounting said lift arm link to serve as a stand for holding said mounting ear above a ground surface at a level substantially similar to the level of said mounting rod to facilitate interengagement therebetween.

2. Apparatus according to claim 1 said lift frame bracket further including auxiliary bracket means engageable with said lift arm link receiving bracket and with said piston means for holding said piston means immobile when said lift arm link is detached from said lift frame.

3. Apparatus according to claim 1 wherein said mounting bracket is of greater horizontal extent than said ear and wherein said vertical walls of said mounting bracket present sufficient vertical surface between said mounting rod and said retaining pin receiving means to allow a predetermined amount of play between said mounting bracket and said ear, thereby permitting a predetermined degree of rotation of said blade or the like in the horizontal plane to permit said blade to follow an uneven ground contour during plowing.

4. Apparatus according to claim 1 wherein said means for mounting said lift arm link to said blade-carrying frame comprises means forming a link-receiving bracket coupled to said blade-carrying frame and having at least one pair of through apertures alignable with an aperture in said lift arm normally provided for mounting to said lift frame and pin means insertable through said aligned apertures.

5. Apparatus according to claim 4, said link-receiving bracket having a portion extending outwardly of said blade-carrying frame and having through apertures alignable with a side surface of said lift arm link and further pin means removably insertable through said aligned apertures for abutting said lift arm link side surface to hold said lift arm link against rotation about the first pin means.

6. Apparatus according to claim 5 wherein a plurality of pairs of substantially vertically aligned apertures are provided in said link-receiving bracket for selective alignment with said lift arm link aperture to adjust the height at which said lift arm link holds said blade-carrying frame.

7. Apparatus for joining a frame member for carrying a snowplow blade or the like to a vehicle-mounted lift frame or the like, comprising: at least one mounting bracket member rigidly attached to said lift frame and including a pair of parallel, generally vertical walls supporting a generally horizontal mounting rod therebetween, means forming at least one mounting ear on said blade-carrying frame, said mounting ear being of lesser width than the space between said parallel, generally vertical walls of said bracket member and having a generally vertically oriented slot of predetermined depth therein rotatably engageable with and over said generally horizontal mounting rod to define a rotatable joint, a retaining pin, means in said mounting bracket member for removably receiving said retaining pin generally vertically above said mounting rod and substantially parallel therewith, the space between said retaining pin receiving means and said mounting rod being sufficient to allow relative rotation of said mounting ear with respect to said mounting rod but of lesser extent than said predetermined depth of said slot in said mounting ear, a lift arm link mounted at an upper portion of said lift frame and positioned for transmitting motion between a lifting piston and said blade-carrying frame member to effect lifting and lowering of a snowplow blade or the like mounted to said blade-carrying frame member, means for removably mounting said lift arm link to said lift frame and means on said blade-carrying frame for removably mounting said lift arm link to serve as a stand for holding said mounting ear above a ground surface at a level substantially similar to the level of said mounting rod to facilitate interengagement therebetween.

8. Apparatus according to claim 7 wherein said means for mounting said lift arm link to said lift frame includes a lift frame bracket formed in said lift frame and cooperating apertures in said bracket and in said lift arm for receiving a pin, thereby rotatably mounting said lift arm linkage to said lift frame.

9. Apparatus according to claim 8 said lift frame bracket further including auxiliary bracket means engageable with said lift arm link receiving bracket and with said piston means for holding said piston means immobile when said lift arm link is detached from said lift frame.

10. Apparatus according to claim 7 wherein said means for mounting said lift arm link to said blade-carrying frame comprises means forming a link receiving bracket coupled to said blade-carrying frame and having at least one pair of through apertures alignable with an aperture in said lift arm normally provided for mounting to said lift frame and pin means insertable through said aligned apertures.

11. Apparatus according to claim 10, said link receiving bracket forming means having a portion extending outwardly of said blade-carrying frame and having through apertures alignable with a side surface of said lift arm link and further pin means removably insertable through said aligned apertures for abutting said lift arm link side surface to hold said lift arm link against rotation about the first pin means.

12. Apparatus for use with a frame member for carrying a snowplow blade or the like and a vehicle-mounted lift frame or the like, comprising: at least one mounting bracket member rigidly attached to said lift frame and including a pair of walls supporting a generally horizontal mounting rod therebetween, means forming at least one mounting ear on said blade-carrying frame, said mounting ear being of lesser width than the space between said walls of said bracket member and having a generally vertically oriented slot of predetermined depth therein rotatably engageable with and over said generally horizontal mounting rod to define a rotatable joint, a retaining pin, means in said mounting bracket member for removably receiving said retaining pin generally vertically above said mounting rod and substantially parallel therewith, the space between said retaining pin receiving means and said mounting rod being sufficient to allow relative rotation of said mounting ear with respect to said mounting rod but of lesser extent than said predetermined depth of said slot in said mounting ear, a lift arm link mounted at an upper portion of said lift frame and positioned for transmitting motion between a lifting piston and said blade-carrying frame member to effect lifting and lowering of a snowplow blade or the like mounted to said blade-carrying frame member, means for removably mounting said lift arm link to said lift frame and means on said blade-carrying frame for removably mounting said lift arm link to serve as a stand for holding a mounting ear on said blade-carrying frame above a ground surface at a level substantially similar to the level of a mounting rod on said lift frame to facilitate interengagement therebetween.

13. Apparatus according to claim 12 wherein said means for mounting said lift arm link to said lift frame includes a lift frame bracket formed in said lift frame and cooperating apertures in said bracket and in said lift arm link for receiving a pin, thereby rotatably mounting said lift arm link to said lift frame.

14. Apparatus according to claim 13 said lift frame bracket further including auxiliary bracket means engageable with said lift arm link receiving bracket and with said lifting piston for holding said lifting piston immobile when said lift arm link is detached from said lift frame.

15. Apparatus according to claim 12 wherein said means for mounting said lift arm link to said blade-carrying frame comprises means forming a link receiving bracket coupled to said blade-carrying frame and having at least one pair of through apertures alignable with an aperture in said lift arm normally provided for mounting to said lift frame and pin means insertable through said aligned apertures.

16. Apparatus according to claim 15, said link receiving bracket forming means having a portion extending outwardly of said blade-carrying frame and having through apertures alignable with a side surface of said lift arm link and further pin means removably insertable through said aligned apertures for abutting said lift arm link side surface to hold said lift arm link against rotation about the first pin means.

17. Apparatus according to claim 16 wherein a plurality of pairs of substantially vertically aligned apertures are provided in said link-receiving bracket for selective alignment with said lift arm link aperture to adjust the height at which said lift arm link holds said blade-carrying frame.

18. Apparatus for joining a frame member for carrying a snowplow blade or the like to a vehicle-mounted lift frame or the like, comprising: mounting bracket means coupled to said lift frame, said mounting bracket means including generally horizontal bar means, mounting ear means on said blade-carrying frame, said mounting ear means including generally vertically oriented slot means rotatably engageable with and over said bar means to define a rotatable joint between the blade-carrying frame and the lift frame, a retaining pin, and means in said mounting bracket means for removably receiving said retaining pin for retaining said mounting ear rotatably engaged therewith and further cooperating means in said mounting bracket means and said mounting ear means for permitting a predetermined amount of play therebetween in both vertical and horizontal planes and further including a lift arm link mounted at an upper portion of said lift frame and positioned for transmitting motion between a lifting piston and said blade-carrying frame member to effect lifting and lowering of a snowplow blade or the like mounted to said blade-carrying frame member, means for removably mounting said lift arm link to said lift frame and means on said blade-carrying frame for removably mounting said lift arm link to serve as a stand for holding said mounting ear above a ground surface at a level substantially similar to the level of said mounting rod to facilitate interengagement therebetween.

* * * * *